C. B. HATFIELD & C. B. HATFIELD, Jr.
MOTOR DRIVEN STEERING AXLE FOR MOTOR VEHICLES.
APPLICATION FILED MAR. 29, 1910.
1,012,847.
Patented Dec. 26, 1911.
3 SHEETS—SHEET 1.
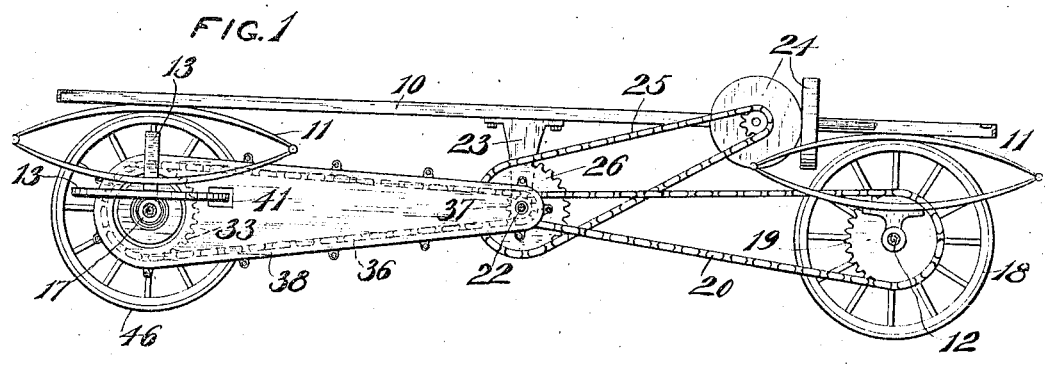
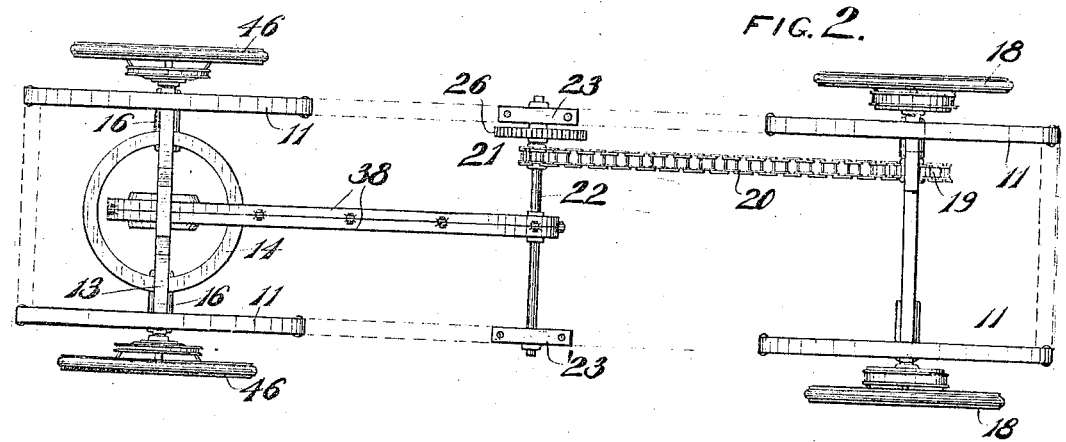
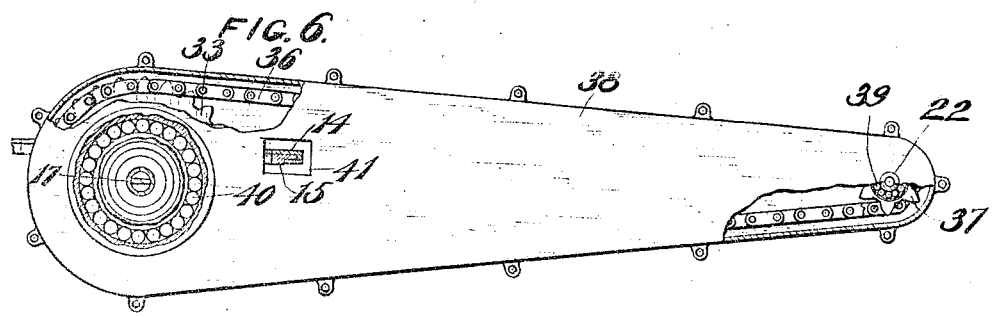

C. B. HATFIELD & C. B. HATFIELD, Jr.
MOTOR DRIVEN STEERING AXLE FOR MOTOR VEHICLES.
APPLICATION FILED MAR. 29, 1910.
1,012,847.
Patented Dec. 26, 1911.
3 SHEETS—SHEET 2.
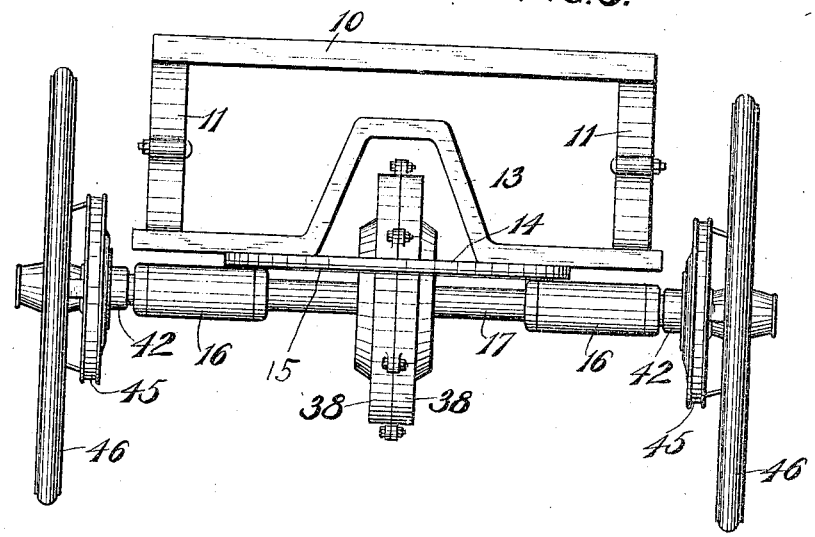
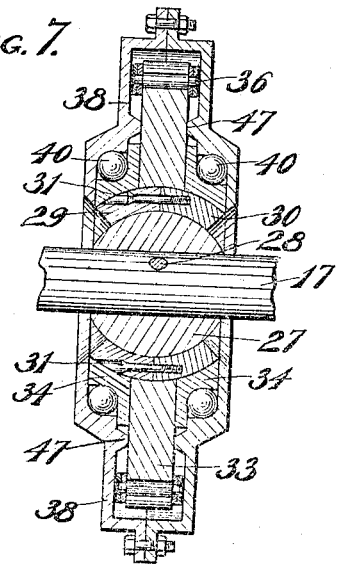
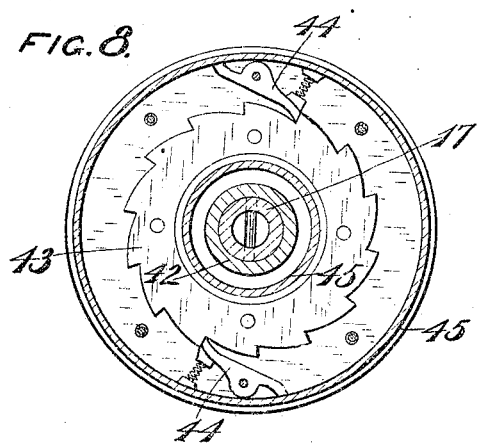

C. B. HATFIELD & C. B. HATFIELD, Jr.
MOTOR DRIVEN STEERING AXLE FOR MOTOR VEHICLES.
APPLICATION FILED MAR. 29, 1910.
1,012,847.
Patented Dec. 26, 1911.
3 SHEETS—SHEET 3.
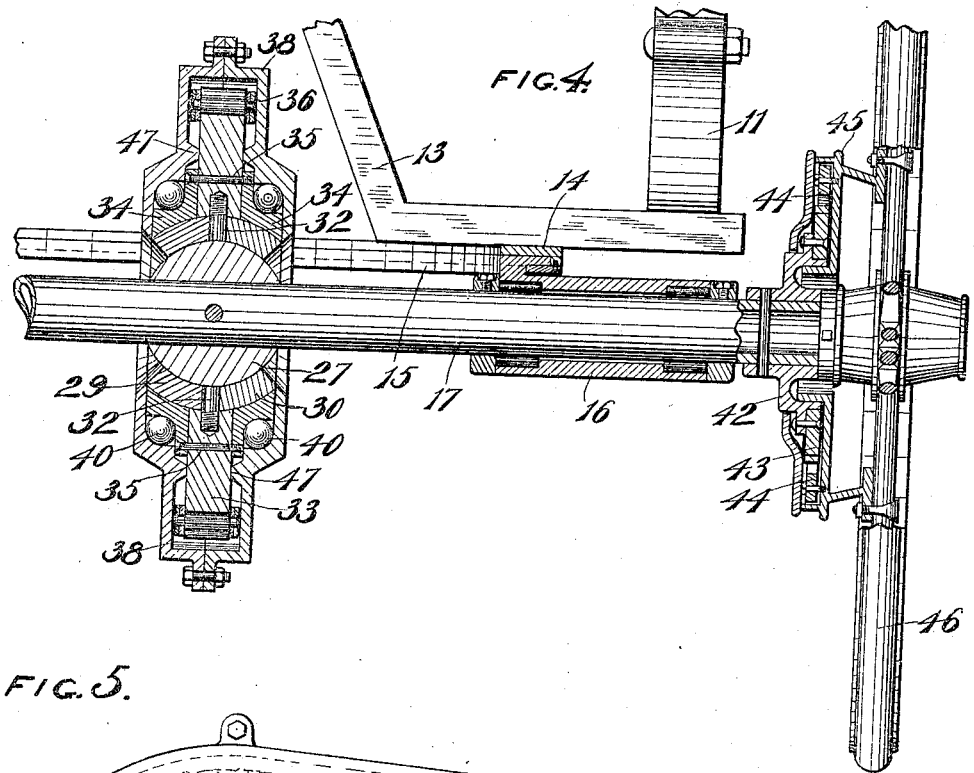
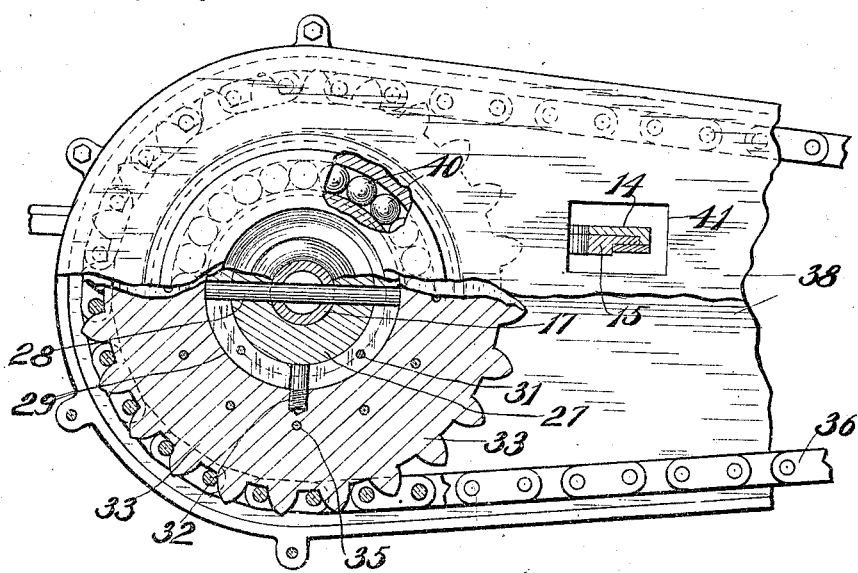

UNITED STATES PATENT OFFICE.

CHARLES B. HATFIELD AND CHARLES B. HATFIELD, JR., OF CORNWALL-ON-THE-HUDSON, NEW YORK.

MOTOR-DRIVEN STEERING-AXLE FOR MOTOR-VEHICLES.

1,012,847.                Specification of Letters Patent.        Patented Dec. 26, 1911.

Application filed March 29, 1910.   Serial No. 552,129.

*To all whom it may concern:*

Be it known that we, CHARLES B. HATFIELD and CHARLES B. HATFIELD, Jr., citizens of the United States, and residents of Cornwall-on-the-Hudson, Orange county, New York, have invented certain new and useful Improvements in Motor-Driven Steering-Axles for Motor-Vehicles, of which the following is a specification.

This invention has for its object to provide an improved motor driven steering axle for motor vehicles which will enable the vehicle to be driven by means of the front wheels as well as the rear wheels and without interfering with the ability to steer with the front wheels.

Another object of the invention is to provide a swinging casing inclosing the driving member for such driven gear which will perform the office of a radius bar in maintaining the position of the front axle with relation to the vehicle frame.

With the above and other objects in view the invention consists in the motor driven steering axle and connections hereinafter claimed.

Referring to the accompanying drawings in which like characters of reference indicate the same parts in the different views: Figure 1 is a sectional elevation of a motor vehicle provided with a motor driven steering axle of this invention; Fig. 2 is a plan view thereof with the frame shown in dotted lines; Fig. 3 is a front elevation thereof; Fig. 4 is a central sectional elevation of a portion of the front axle showing the details of its driving connection; Fig. 5 is an elevation partly in section of the driving connection for the front axle; Fig. 6 is an elevation partly in section of the chain guard for the driving connection of the front axle; Fig. 7 is a transverse sectional view of the driving connection for the front axle; and Fig. 8 is a sectional detail view of the ratchet connection for the wheels of the front axle.

In these drawings 10 indicates a vehicle frame which is mounted by means of springs 11 on a rear axle 12 and on a cross yoke 13 carrying one member 14 of a fifth wheel whose other member 15 carries journal bearings 16 in which a front axle 17 is mounted. The rear axle 12 is provided with the usual drive wheels 18 and is driven by a sprocket wheel 19 thereon which is connected by a chain 20 with a sprocket wheel 21 on a jack shaft 22 which is journaled in bracket bearings 23 secured to the under side of the frame 10, said jack shaft being driven by a motor not shown through a transmission gear 24 which is connected by a chain 25 with a sprocket wheel 26 on said jack shaft.

The front axle 17 has a ball or spherical member 27 fitted thereon and locked thereto by means of a pin 28 which passes through the ball and shaft and projects beyond the ball at both ends, as shown in Fig. 5. A ring concavo-convex in cross section is closely fitted around the ball, being formed of ring sections 29 and 30 which are clamped together by screws 31 as shown in Fig. 7, there being pivotal openings formed between the ring sections to receive the projecting ends of pin 28. There are similar pivotal openings formed between the ring sections at right angles to those for pin 28 in which are fitted the inner ends of studs 32 which are threaded in the spherical concave central opening of a sprocket gear 33 which fits upon the spherically convex outer surface of the sectional ring. To increase the effective breadth of the bearing face of the sprocket gear 33 on the ring, side pieces 34 are secured to the opposite sides thereof by means of bolts 35 passing through them as shown in Fig. 4, such side pieces being so shaped on their inner faces as to extend the bearing fit upon the sectional ring. The spherical fit of the ring upon the ball 27 permits said ring to swing upon the pin 28 around the ball to an extent which is limited by the engagement of the ring with the front axle, while the spherical fit of the sprocket gear 33 and its side pieces likewise permits said sprocket gear to swing upon the studs 32 around the ring.

The sprocket gear 33 is driven by a chain 36 from a sprocket wheel 37 on the jack shaft 22 and a casing 38 made in sections clamped together surrounds said chain with a ball bearing connection 39 with the sprocket wheel 37 on jack shaft 22 and a ball bearing connection 40 with the side pieces 34 of the sprocket gear 33, as shown in Fig. 4, so that said guard forms a radius bar to distance the front axle from the jack shaft and the frame while permitting a spring movement between the front axle and the frame so that they may move toward and away from each other. An opening 41 is provided through the guard 38 to permit the fifth wheel to pass therethrough, as clearly shown in Figs. 5 and 6.

In order that the front axle may be driven by the motor it is necessary to provide for a different speed of the two front wheels when turning corners, either by means of a ratchet connection between the wheels and the axle or by means of a differential gear. For this purpose we prefer to provide a ratchet mechanism for each front wheel as shown in Figs. 4 and 8, wherein a member 42 pinned on the front axle carries a ratchet 43 which is engaged by spring pressed dogs 44 mounted on a member 45 which is carried by the front wheel 46.

In operation the driving connection is maintained from the motor driven jack shaft 22 to the front axle as well as to the rear axle if desirable so as to drive all four wheels of the vehicle and still the front axle may be swung in any desirable manner to accomplish the steering of the vehicle, the relation of the spherical member 27 and the member 33 with the interposed ring being in the nature of a universal connection which will transmit the driving power from the driving member to the axle in any angular position of the axle with relation to the driven member, said parts turning on the pivotal connections formed by the universal joint member.

The spherical fit of the ring upon the ball and of the sprocket gear upon the ring form direct bearings, between these members to take the strain of the driving chain and also the thrust occasioned by casing 38 acting as a radius bar at the time of the wheels meeting with an obstruction in the roadway, thus relieving the studs 32 and the pin 28 of the increased wear to which they would be subjected if depended upon to resist these forces, leaving to the studs and pin only the function of determining the pivotal axis for the universal joint movement.

The guard 38 serves to hold the driven member 33 in its upright position, having inwardly projecting annular flanges 47 bearing on opposite sides of the driven member for this purpose, and holds said driven member at the proper distance from the jack shaft to keep the connecting driving device distanced and also serves the purpose of a radius rod for maintaining the proper position of the front axle with relation to the frame and other parts.

It is obvious that any lubricant may be filled into the chain guard so as to be taken up by the chain and distributed to all of the operative parts within the guard and thus keep all working parts well lubricated.

We claim—

1. In a motor vehicle, the combination with an axle having a pivotal connection with the frame for steering, of a ball member secured to the axle, a driven gear surrounding the axle, a spherical ring mounted and snugly fitting on the ball member and having a convex surface upon which the gear is mounted, and pivotal connections between the ring and the ball member and between the ring and the gear at substantially right angles to each other.

2. In a motor vehicle, the combination with an axle having a pivotal connection with the frame for steering, of a ball member secured to the axle, a driven gear surrounding the axle, a spherical ring mounted and snugly fitting on the ball member and having a convex surface upon which the gear is mounted, a pin passing through the ball member and the axle, and projecting beyond the ball member to fit in openings in the ring, and pins projecting from the gear and fitting into openings in the ring, said pins being substantially at right angles to the pin which passes through the ball and axle.

3. In a motor vehicle, the combination with an axle, having a pivotal connection with the frame for steering, of a ball member secured to the axle, a driven gear surrounding the axle, a ring on the ball member formed of a plurality of ring sections secured together and having a concave inner surface to fit upon the ball member and a convex outer surface to fit within the gear, a pin passing through the ball member and the axle and having projecting ends fitting in openings in the ring and pins projecting inwardly from the gear within the pivotal openings of the ring, said pins lying at substantially right angles to the pin which passes through the ball member.

4. In a motor vehicle, the combination with an axle having a pivotal connection with the frame for steering, of a ball member secured to the axle, a driven gear attached on the axle, a ring on the ball member having a convex surface upon which the gear is mounted, side pieces secured to the gear to increase its bearing upon the ring, and pivotal connections between the ball member and the ring and between the ring and the gear on axes at substantially right angles to each other.

5. In a motor vehicle, the combination with the frame thereof, of an axle having a steering connection with the frame, a drive shaft journaled in the frame, a sprocket gear on the axle, a chain connecting the sprocket gear with the drive shaft, an intermediate member pivotally connected to the axle and the sprocket gear on axes at substantially right angles to each other, and means mounted on the drive shaft inclosing and supporting the sprocket gear in an upright position.

6. In a motor vehicle, the combination with the frame thereof, of an axle having a fifth wheel connection with the frame, a drive shaft journaled in the frame, a sprocket gear on the axle, a chain connecting the sprocket gear with the drive shaft, an intermediate member pivotally connected to the axle and the sprocket gear on axes at substantially a right angle to each other, and a chain guard inclosing the chain and the two sprocket gears and having an opening through which one side of the fifth wheel is passed.

Witness our hands this 4 day of March, 1910, at Cornwall-on-Hudson, N. Y.

CHARLES B. HATFIELD.
CHARLES B. HATFIELD, Jr.

Witnesses:
WILLIAM R. BAIRD,
STEPHEN S. NEWTON.